United States Patent
Sareen et al.

(10) Patent No.: US 11,455,698 B2
(45) Date of Patent: Sep. 27, 2022

(54) AUTOMATICALLY UPGRADING A LICENSE TO REDUCE TRAFFIC INTERRUPTIONS WITHIN A NETWORK

(71) Applicant: Ciena Corporation, Hanover, MD (US)

(72) Inventors: Jatin Sareen, Gurgaon (IN); Vinod Kumar, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 163 days.

(21) Appl. No.: 16/997,280

(22) Filed: Aug. 19, 2020

(65) Prior Publication Data

US 2022/0012832 A1   Jan. 13, 2022

(30) Foreign Application Priority Data

Jul. 7, 2020   (IN) .............................. 202011028793

(51) Int. Cl.
| | |
|---|---|
| *G06F 15/173* | (2006.01) |
| *G06F 15/16* | (2006.01) |
| *G06Q 50/18* | (2012.01) |
| *H04L 41/5009* | (2022.01) |
| *H04L 41/06* | (2022.01) |
| *G06Q 30/02* | (2012.01) |
| *H04L 41/0654* | (2022.01) |

(52) U.S. Cl.
CPC ....... *G06Q 50/184* (2013.01); *G06Q 30/0283* (2013.01); *H04L 41/06* (2013.01); *H04L 41/0654* (2013.01); *H04L 41/5012* (2013.01)

(58) Field of Classification Search
CPC . H04L 41/06; H04L 41/0654; H04L 41/5012; G06Q 30/0283; G06Q 50/184

USPC .................................................. 709/238-239
See application file for complete search history.

(56) References Cited

U.S. PATENT DOCUMENTS

| | | | |
|---|---|---|---|
| 7,035,918 B1 * | 4/2006 | Redding ............ | G06Q 30/0607 709/203 |
| 9,497,521 B2 | 11/2016 | Sareen et al. | |
| 9,853,722 B1 | 12/2017 | Sharma et al. | |
| 9,917,668 B2 | 3/2018 | Juneja et al. | |
| 10,013,535 B2 | 7/2018 | Thomas et al. | |
| 10,027,574 B2 | 7/2018 | Sareen et al. | |
| 10,341,258 B2 | 7/2019 | Sareen et al. | |
| 10,382,276 B2 | 8/2019 | Sareen et al. | |

(Continued)

*Primary Examiner* — Bharat Barot
(74) *Attorney, Agent, or Firm* — Clements Bernard Baratta; Lawrence A. Baratta, Jr.; Christopher L. Bernard (57) ABSTRACT

Systems and methods for automatically upgrading a license in a communication network are provided. In one embodiment, a network device in communication with a license server may be configured with a processing device and a memory device configured to store a computer program having instructions that, when executed, cause the processing device to analyze a communication path between first and second nodes of a communication system and analyze a first license agreement having a first set of constraints regarding communication between the first and second nodes. Responsive to determining that the communication path is not allowable under the first set of constraints of the first license agreement, the instructions may further cause the processing device to upgrade the first license agreement to a second license agreement having a second set of constraints that are less-restrictive than the first set of constraints regarding communication between the first and second nodes.

17 Claims, 4 Drawing Sheets

(56) References Cited

U.S. PATENT DOCUMENTS

| | | |
|---|---|---|
| 11,074,322 B1 * | 7/2021 | R. .................... G06F 21/105 |
| 2016/0043797 A1 | 2/2016 | Sareen et al. |
| 2017/0091430 A1 * | 3/2017 | Lemelev ................ H04L 67/34 |
| 2019/0164242 A1 * | 5/2019 | Zhang .................. G06Q 50/184 |
| 2020/0092186 A1 | 3/2020 | Sareen et al. |
| 2021/0143904 A1 * | 5/2021 | Rao ...................... G06Q 30/018 |
| 2021/0209198 A1 * | 7/2021 | Block .................. G06Q 50/184 |

* cited by examiner

| MODEM CLASS | REACH CLASS | LICENSE NEEDED |
|---|---|---|
| Terrestrial | Terrestrial Base | Terrestrial license class 1 (up to 1000km) |
| | Terrestrial 2 | Terrestrial license class 2 (up to 2000km) |
| | Terrestrial 5 | Terrestrial license class 5 (up to 5000km) |
| | Terrestrial 8 | Terrestrial license class 8 (up to 8000km) |
| Submarine | Submarine Base | Submarine license class 2 (up to 3500km) |
| | Submarine 9 | Submarine license class 9 (up to 9000km) |
| | Submarine 14 | Submarine license class 14 (up to 14000km) |

AUTOMATICALLY UPGRADING A LICENSE TO REDUCE TRAFFIC INTERRUPTIONS WITHIN A NETWORK

TECHNICAL FIELD

The present disclosure generally relates to networking systems and methods. More particularly, the present disclosure relates to licenses having constraints for limiting the operating characteristics of network elements and further relates to processes for automatically upgrading the license to a higher class in a control plane in order to maintain traffic resiliency, such as when a fault is detected in a primary path.

BACKGROUND

Licenses are typically used in a communication system to allow nodes to communicate within certain constraints. For example, one set of constraints may include a maximum optical "reach" (i.e., the maximum distance that signals may be transmitted along a communication path between neighboring nodes). Although two nodes may usually communicate over a primary path, occasionally this primary path may become unavailable (e.g., due to a fiber break or other fault in the primary path) and the nodes may attempt to restore communication along alternative routes. However, at times, these alternative routes may not meet the constraints already established for communication along the primary path with a current license.

In the event that a reach violation is detected, which may result in an alarm being sent to a network operator, the traffic may be blocked along all paths between the two nodes. Thus, if a fault is detected on a primary path and all other alternative paths have a reach that extends beyond the allowable reach constraints according to the current license, the network operator may then need to manually acquire a new license from a license server and manually change the reach of each modem after acquiring the new license with an extended reach. However, during the process of manually acquiring the new license, traffic is usually stopped between these nodes, which may result in a low Quality of Experience (QoE) for users. Another shortcoming of the conventional licensing systems is that there are currently no provisions to have a shared pool of licenses for increased traffic resiliency on the photonic layer for Subnetwork Connections (SNCs) in an optical control plane. Therefore, there is a need in the field of network licensing to improve the conventional systems to be able to restore traffic automatically with little or no human interaction and to overcome the other shortcomings of the conventional systems.

BRIEF SUMMARY

The present disclosure is directed to systems, methods, and non-transitory computer-readable media for automatically upgrading a license that restricts certain transmission characteristics associated with a transmission link or communication path between two neighboring nodes or Network Elements (NEs). According to one embodiment, a network device in communication with a license server includes a processing device and a memory device configured to store a computer program. The computer program includes instructions that, when executed, cause the processing device to analyze a communication path between first and second nodes of a communication system and analyze a first license agreement having a first set of constraints regarding communication between the first and second nodes. Furthermore, responsive to determining that the communication path is not allowable under the first set of constraints of the first license agreement, the instructions further cause the processing device to upgrade the first license agreement to a second license agreement having a second set of constraints that are less-restrictive than the first set of constraints regarding communication between the first and second nodes.

According to another embodiment of the present disclosure, a non-transitory computer-readable medium is configured to store computer logic having instructions that, when executed, cause one or more processing devices to perform certain functions. For example, the computer logic causes the one or more processing devices to analyze a communication path between first and second nodes of a communication system and analyze a first license agreement having a first set of constraints regarding communication between the first and second nodes. Responsive to determining that the communication path is not allowable under the first set of constraints of the first license agreement, the instructions further cause the one or more processing devices to upgrade the first license agreement to a second license agreement having a second set of constraints that are less-restrictive than the first set of constraints regarding communication between the first and second nodes.

According to yet another embodiment, a method includes the steps of analyzing a communication path between first and second nodes of a communication system and analyzing a first license agreement having a first set of constraints regarding communication between the first and second nodes. Responsive to determining that the communication path is not allowable under the first set of constraints of the first license agreement, the method also includes the step of upgrading the first license agreement to a second license agreement having a second set of constraints that are less-restrictive than the first set of constraints regarding communication between the first and second nodes.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for establishing flexible licensing in a communication network.

As such, a license can be upgraded as needed while the communication network is in operation to account for changes in the communication network. Therefore, by allowing the flexibility to automatically upgrade the license, the risk of traffic interruption can be mitigated. By upgrading in real time, traffic can continue uninterrupted without requiring a network operator to manually conduct license upgrade procedures.

The systems and methods may include analyzing communication paths between pairs of nodes or Network Elements (NEs) within a communication system. The systems and methods also analyze a license that is currently in place for restricting the communication between the pairs of nodes or NEs. For example, one restriction may be a "reach" between the pair of communicating elements. The term "reach" as described in the present disclosure may refer to a distance that signals optically travel between the pair of nodes along the length of a specific communication line or link. It may be noted that different communication links between the pair of nodes may have different reaches. In some cases, a primary path between a pair of nodes may be able to meet the reach restrictions set by the current license.

For example, an optical modem, transceiver, or transponder includes physical hardware, software, and firmware configured to enable the transmission and reception of optically modulated signals over fiber optic links. This device can include coherent modulation, Forward Error Correction (FEC), non-linear impairment compensation, dispersion compensation, configurable baud rate, etc. Of note, modules with this device may be deployed with physical hardware that may support all configurations from short reach up to 1000's of kilometers over terrestrial networks and up to over 10,000 kilometers in submarine networks. That is, an optical module can include digital circuitry, such as Digital Signal Processors (DSPs), etc. capable of all of these and other functions, but limited by the applied license.

In the situation where an alternative path may be used, the present disclosure is configured to determine if that alternative path also meets the current license restrictions (e.g., if the alternative path has a length within the designated reach of the current license). If the alternative path is longer than the designated reach, then a new license for operating over this alternative path may be required. The systems and methods of the present disclosure are configured to allow the communication system to automatically upgrade the license to a level where the length of the alternative path is within the specific reach of the new license.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 1:
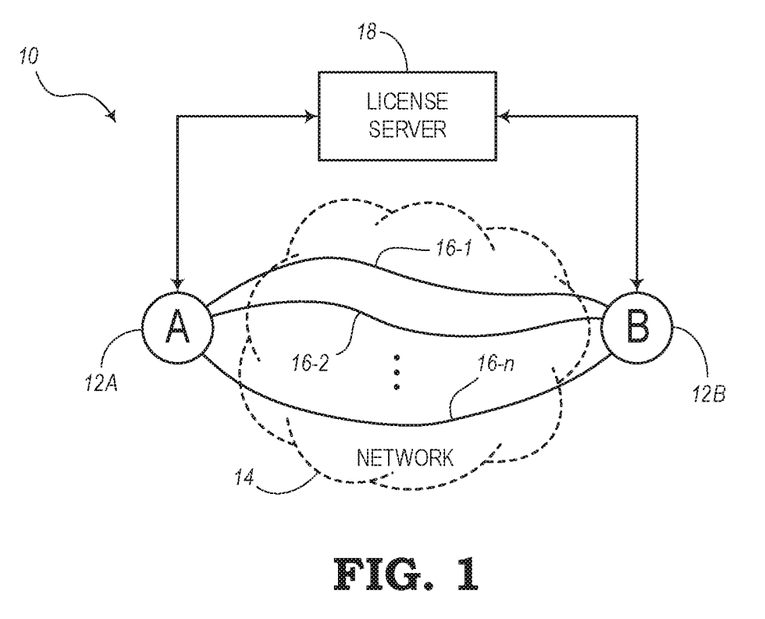
FIG. 1 is a diagram illustrating a portion of a communication system, according to various embodiments of the present disclosure.

FIG. 1 is a diagram illustrating an embodiment of a portion of a communication system 10 that enables a pair of nodes 12 to communicate with each other by way of a network 14. The nodes 12 may also be referred to as Network Elements (NEs), end points, originating/terminating nodes, source/destination nodes, etc. It should be noted that the communication system 10 may include any number of nodes interconnected by links in any suitable configuration (e.g., mesh network). However, for illustrative purposes, only two nodes are shown in FIG. 1. In this embodiment, a first node 12A (Node A) is configured to communicate with a second node 12B (Node B) via a plurality of communication paths 16-1, 16-2, . . . , 16-n (e.g., optical links, fiber optic cable, etc.) of the network 14. The network 14 may allow the transmission of data packets, optical packets, etc. for communicating in Layer 0 (i.e., the photonic layer) of the network 14. For example, Layer 0 may include a control plane for communicating signals related to control, management, maintenance, etc. In some embodiments, the network 14 may include optical SNCs managed by a control plane.

The communication paths 16 may be defined in a Designated Transit List (DTL) for specifying which paths are used by the nodes 12A and 12B for communicating with each other. As known in the art, a DTL in a control plane is a list of nodes and links for a particular connection to traverse. For example, a first communication path 16-1 may be designated as a home path (or primary path) and may be the normal path along which the nodes 12A and 12B communicate. There may also be one or more additional secondary paths (e.g., communication paths 16-2-16-n), whereby one of these secondary paths may be selected for use as an alternative path if a fault is detected along the primary communication path 16-1. The secondary communication paths 16-2-16-n may be referred to as restoration paths, recovery paths, protection paths, etc.

For example, compared to the other paths, the primary communication path 16-1 may represent a path that has a smaller path distance (shorter length) between the nodes 12A and 12B and may also represent a path that has a lower cost for transmitting signals. Also, in particular, nodes 12A and 12B may operate within the limitations of a predefined license by communicating along the primary communication path 16-1. However, if a fault is detected along the primary communication path 16-1 and the nodes 12A and 12B switch to a secondary path (i.e., one of communication paths 16-2-16-n), an issue may arise with respect to whether or not the new secondary path is an acceptable path within the agreed-upon license limitations.

As an example, suppose that the nodes 12A and 12B agree to operate under a license for operation within a maximum reach of 1000 km and the primary communication path 16-1 is less than 1000 km and therefore within the license regulations. However, suppose that a fault is detected on the primary communication path 16-1 and the nodes attempt to switch to a secondary path (i.e., one of communication paths 16-2, . . . 16-n), but each of these secondary paths is greater than 1000 km. In this case, switching to one of the secondary paths would not be acceptable under the current license agreement. Thus, the embodiments of the present disclosure may allow an automatic upgrade from the present license (i.e., up to a 1000 km reach) to a new class of license that allows a greater reach (e.g., up to 2000 km or higher).

A license server 18 may be connected to the nodes 12A, 12B for controlling and/or coordinating license changes with the nodes 12A, 12B. In some embodiments, the license server 18 may be connected to multiple nodes for controlling and/or coordinating license changes with any suitable pairs of nodes in direct communication with each other. The license server 18 may be configured to initially set a starting license (or initial license agreement) for the pair of nodes 12A, 12B to operate over the primary communication path 16-1.

During operation, however, a situation may arise when the nodes 12A, 12B decide to switch to another path. Reasons for such a switch may include a) when a fault is detected on the primary communication path 16-1, b) when new communication paths 16 are added to the communication system 10, c) when traffic on the primary communication path 16-1 is congested, and/or d) other reasons. Before switching to the alternative path, the license server 18 may be utilized to determine if the new path meets the license agreement already in place. If so, then the switch can be made. Otherwise, the license server 18 may be configured to enable an upgrade of the license to a new license that allows communication along the secondary (alternative) communication path 16. For example, if the original license allows for a reach of up to 1000 km, but the alternative path is about 1500 km, then the license server 18 may automatically upgrade to a higher class license that allows communication for a longer reach (e.g., up to 2000 km).

In addition to reach constraints, the license server 18 may be configured to track costs of operating over the various communication paths 16. The costs may be a monetary cost for operating over the paths, a delay cost (e.g., latency) for operating over the paths, licensing costs for upgrading to a higher level class of license, and/or other various costs. According to some embodiments, a network operator utilizing the license server 18 may be able to enter various pre-approved costs that may acceptably be incurred while operation is in progress. Thus, if an upgrade in a license is able to meet the additional cost criteria, then the upgrade can be performed automatically.

Figure 3:
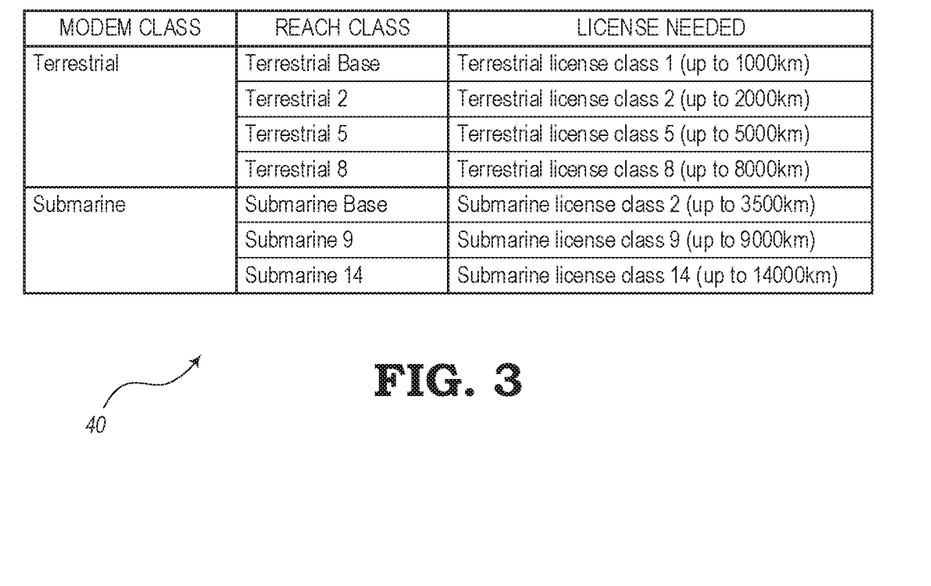
FIG. 3 is a table illustrating an example of specifications of different license classes, according to various embodiments.

According to one example, a "reach class" may be configured at nodes 12A, 12B for "Terrestrial Base" with "Terrestrial license class 1," which may be defined as allowing operation "up to 1000 km." For instance, this reach class is shown in the exemplary table 40 of FIG. 3. In this example, the capacity may be 200 G. For the following, it may be assumed that the first Designated Transit List (DTL) cost in this case may be less than 1000 km and a second DTL cost may be greater than 1000 km, but less than 2000 km. The DTL may include a complete path across a peer group. This example may have a number of prerequisites, including, for instance, that a network operator (e.g., administrator, user, planner, etc.) may have access to a profile map that defines reach, capacity, administrator weights, costs, etc. Another prerequisite may include an automatic upgrade flag that is switched on to enable the automatic license upgrading feature on the Layer 0 control plane or SNC. Yet another prerequisite may include transponders of the photonic system 24 configured with higher reach capability (e.g., based on licenses). The following highlighted points, among others, may result from this example:

1) Layer 0 SNC may work fine initially on the first DTL (e.g., DTL1). The originating/terminating NEs gather the information regarding supported reach types on the nodes 12A, 12B by any possible means (e.g., Service and Photonic Layer Interoperability (SPLI)) which is a term in a control plane used for adjacency discovery, transponder information discovery, and photonics parameter provisioning) and the terminating NE (e.g., node 12B) passes on this information to originating node (e.g., node 12A) as a part of "connect" message for future path computation validations.

2) On DTL1 failure, a newly suggested path computation logic checks if there are available protect paths for SNC meeting the configured cost/reach/capacity criteria. In this example, the initial path computation fails to return the protect paths since available mesh path (e.g., DTL2) is greater than 1000 km.

3) The originating NE queries the reach/cost profile map for configured line capacity to check if there are other paths available with higher cost that may require upgrade in reach license and do not violate the Optical Signal to Noise Ratio (OSNR) vs distance consideration for the configured capacity. In this example, the DTL2 is available which may be less than 2000 km but higher than 1000 km. This distance may be good for 200 G capacity but may require an upgrade to the class 2 license (see FIG. 3) at both ends of the communication path 16 (e.g., at the nodes 12A, 12B).

4) The originating NE queries the shared license server 18 if there are licenses available for class 2 license upgrade on both nodes 12A, 12b. In this example, it is assumed that there are one or more available upgrades.

5) The originating NE (e.g., node 12A) returns the new pre-computed path which requires license upgrade and conveys the same to the terminating node (e.g., node 12B) through notify message, which may be carried on a new path for upgrading license before "setup" is initiated.

6) On receiving a request from SPLI, the nodes 12A, 12B can automatically request the license server 18 to get upgraded licenses from a license pool (e.g., stored in database 60 shown in FIG. 4), after licenses are upgraded, based on notify feedback NE sets the SNC on the new route. With the upgraded license, the SNC traffic comes up fine in the new path with a higher reach.

Figure 4:
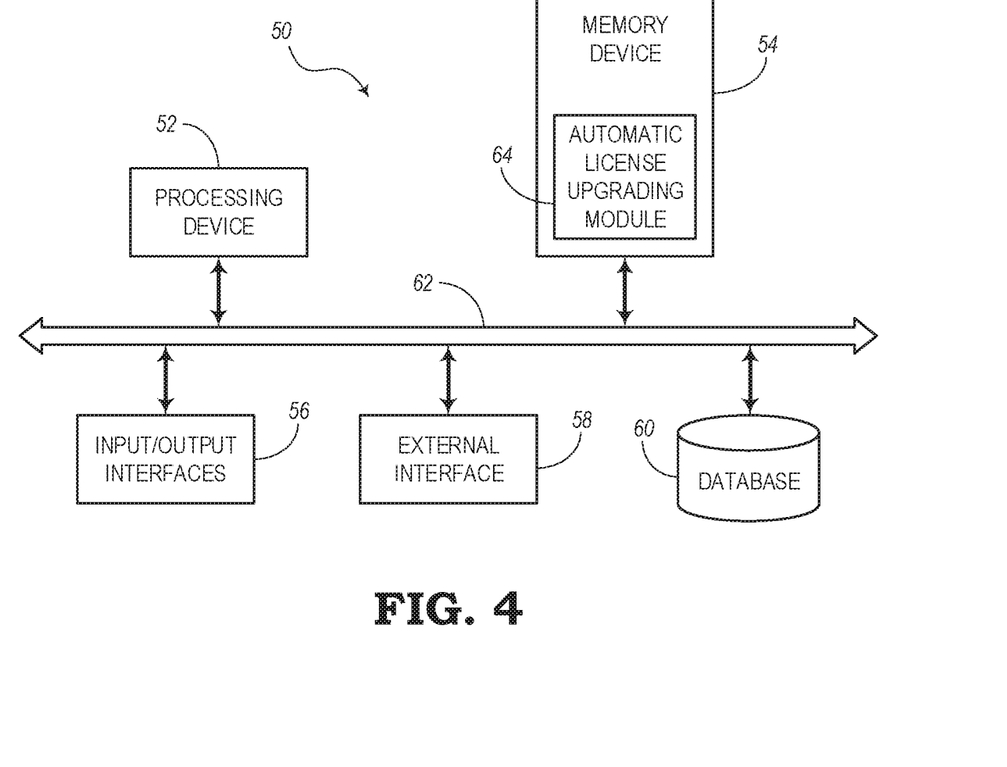
FIG. 4 is a block diagram illustrating a computing system configured to automatically upgrade a license for transmitting signals with a network, according to various embodiments.

7) (optional) The SNC may store the base license and upgraded license information in its database (e.g., database 60), whenever the path is available and meets the base license criteria. This may occur during a next mesh event and may revert back to the base license configuration on the nodes. At this point, the higher license may be released, and the system may revert back to the license server for other services to use.

Figure 2:
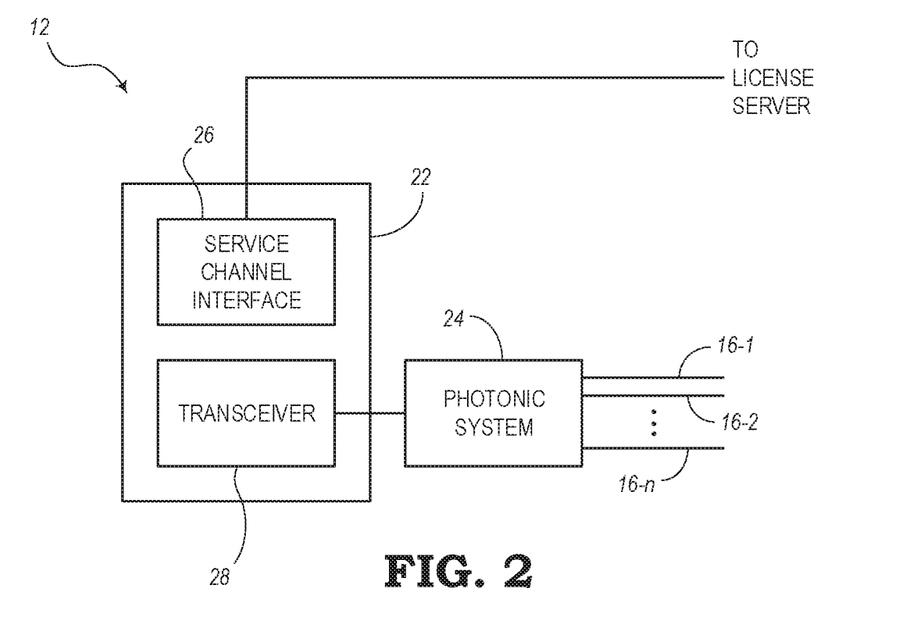
FIG. 2 is a block diagram illustrating one of the nodes of the communication system of FIG. 1, according to various embodiments.

FIG. 2 is a block diagram illustrating an embodiment of a node 12 (e.g., the first node 12A or Node A) of the communication system 10 of FIG. 1. In this embodiment, the node 12 includes a modulator/demodulator or modem 22 and a photonic system 24. The modem 22 may be any gateway device that connects a local network to the network 14. The modem 22 includes a service channel interface 26 and a transceiver 28. The transceiver 28 is configured to communicate optical signals to one or more of the communication paths 16-1, 16-2, . . . , 16-$n$ of the photonic system 24. The service channel interface 26 is configured to communicate with the license server 18 to upgrade one or more licenses (e.g., reach class license, etc.) as needed. Again, a license may need to be upgraded if there is a fault along the primary communication path 16-1 and if any cost increase meets the pre-established cost criteria (if any). As described herein, the transceiver 28 is referenced for the physical hardware enabling optical communication based on the license. Those skilled in the art recognize other terms for transceiver include transponder, transmitter/receiver, etc., and each is contemplated herein. That is, the present disclosure can be used on any hardware device in the node 12 that operates based on a license, and the aspect of distance is merely presented for illustration purposes.

FIG. 3 is a table 40 illustrating an example of specifications of different license classes. Again, this use case illustrates reach as the example of the license class, but other aspects are also contemplated. In an embodiment, the modem 22 at each node 12 may be separated into one of two classes, that is, a "terrestrial" modem for communication over land and a "submarine" modem for communication under water. Each of these classes can then be separated into any number of different reach classes, whereby each reach class can be defined with respect to the allowable reach (i.e., distance along a communication path 16) for operating within that specific reach class. The license needed for each reach class shows the maximum distance (in kilometers) that are supported by that license. According to other embodiments, various classes of license may pertain to other conditions, such as costs (e.g., license upgrade cost, transmission costs, delay costs, etc.), channel bandwidth characteristics, and/or other signal transmission characteristics and communication link characteristics.

FIG. 4 is a block diagram illustrating an embodiment of a computing system 50 that may be configured to operate in the communication system 10. The computing system 50 may represent the license server 18 shown in FIG. 1, the modem 22 of one of the nodes 12, a network device in communication with the license server 18, or another device within the communication system 10. In the illustrated embodiment, the computing system 50 may be a digital computer that, in terms of hardware architecture, generally includes a processing device 52, a memory device 54, Input/Output (I/O) interfaces 56, an external interface 58, and a database 60. The memory device 54 may include a data store, database (e.g., database 60), or the like. It should be appreciated by those of ordinary skill in the art that FIG. 4 depicts the computing system 50 in a simplified manner, where practical embodiments may include additional components and suitably configured processing logic to support known or conventional operating features that are not described in detail herein. The components (i.e., 52, 54, 56, 58, 60) are communicatively coupled via a local interface 62. The local interface 62 may be, for example, but not limited to, one or more buses or other wired or wireless connections. The local interface 62 may have additional elements, which are omitted for simplicity, such as controllers, buffers, caches, drivers, repeaters, receivers, among other elements, to enable communications. Further, the local interface 62 may include address, control, and/or data connections to enable appropriate communications among the components 52, 54, 56, 58, 60.

The processing device 52 is a hardware device adapted for at least executing software instructions. The processing device 52 may be any custom made or commercially available processor, a Central Processing Unit (CPU), an auxiliary processor among several processors associated with the computing system 50, a semiconductor-based microprocessor (in the form of a microchip or chip set), or generally any device for executing software instructions. When the computing system 50 is in operation, the processing device 52 may be configured to execute software stored within the memory device 54, to communicate data to and from the memory device 54, and to generally control operations of the computing system 50 pursuant to the software instructions.

It will be appreciated that some embodiments of the processing device 52 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 52 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 56 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 56 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The external interface 58 may be used to enable the computing system 50 to communicate over a network, such as the network 14, the Internet, a Wide Area Network (WAN), a Local Area Network (LAN), and the like. The external interface 58 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The external interface 58 may include address, control, and/or data connections to enable appropriate communications on the network 14.

The memory device 54 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 54 may incorporate electronic, magnetic, optical, and/or other types of storage media. The memory device 54 may have a distributed architecture, where various components are situated remotely from one another, but can be accessed by the processing device 52. The software in memory device 54 may include one or more software programs, each of which may include an ordered listing of executable instructions for implementing logical functions. The software in the memory device 54 may also include a suitable Operating System (O/S) and one or more computer programs. The 0/S essentially controls the execution of other computer programs, and provides scheduling, input-output control, file and data management, memory management, and communication control and related services. The computer programs may be configured to implement the various processes, algorithms, methods, techniques, etc. described herein.

The memory device 54 may include a data store used to store data. In one example, the data store may be located internal to the computing system 50 and may include, for example, an internal hard drive connected to the local interface 62 in the computing system 50. Additionally, in another embodiment, the data store may be located external to the computing system 50 and may include, for example, an external hard drive connected to the Input/Output (I/O) interfaces 56 (e.g., SCSI or USB connection). In a further embodiment, the data store may be connected to the computing system 50 through a network and may include, for example, a network attached file server.

Moreover, some embodiments may include a non-transitory computer-readable storage medium having computer readable code stored in the memory device 54 for programming the computing system 50 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 52 that, in response to such execution, cause the processing device 52 to perform a set of operations, steps, methods, processes, algorithms, functions, techniques, etc. as described herein for the various embodiments.

For example, in some embodiments, the memory device 54 may be configured to store an automatic license upgrading module 64, configured as computer software or logic for enabling the processing device 52 to perform certain functions with respect to automatically upgrading a license agreement in the communication system 10. For example, the automatic license upgrading module 64 may be configured to perform the processes described with respect to FIGS. 5 and 6 and may be configured to execute other functions related to automatically upgrading a license agreement within a network as described throughout the present disclosure.

Figure 5:
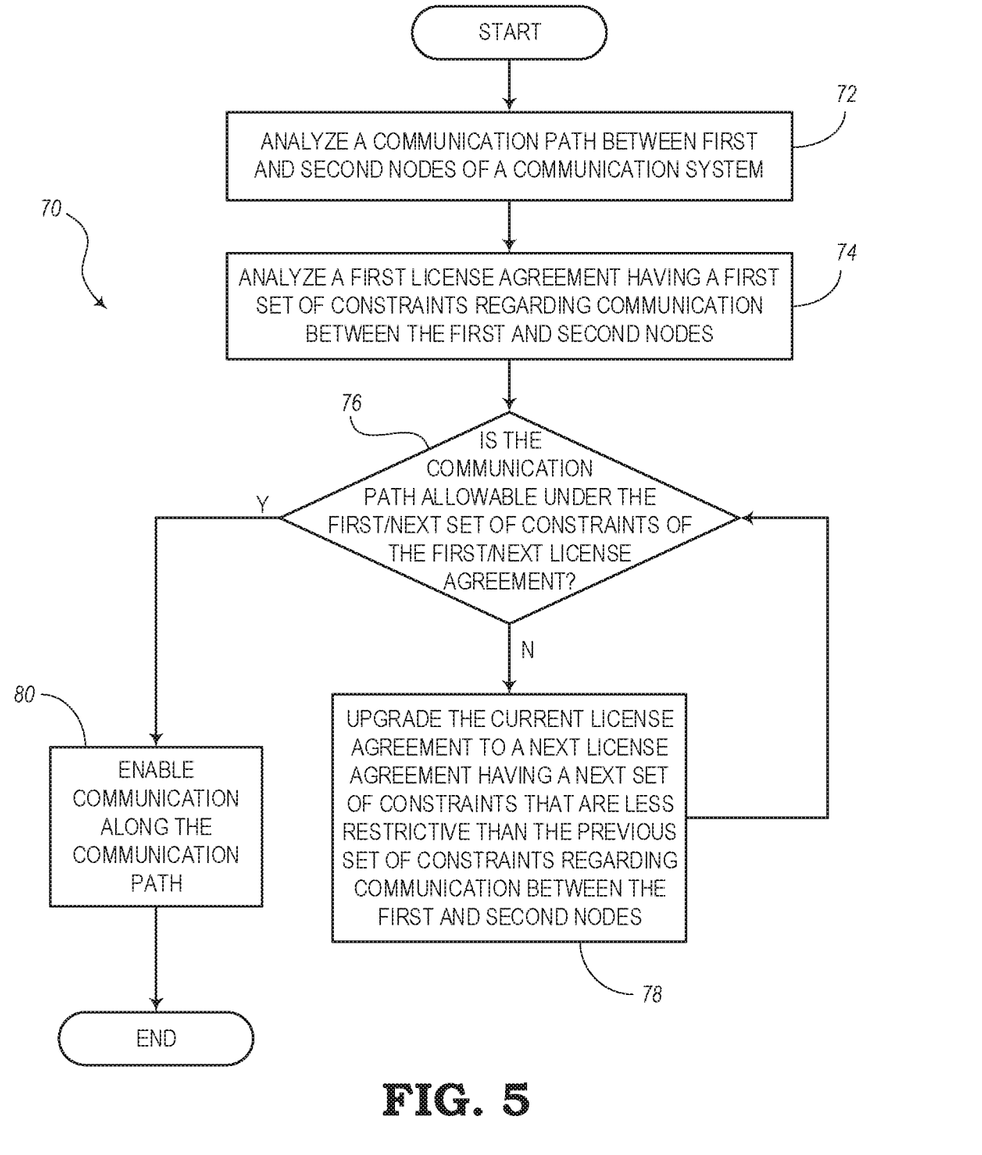
FIG. 5 is a flow diagram illustrating a generalized process for automatically upgrading a license within a communication system, according to various embodiments.

FIG. 5 is a flow diagram illustrating an embodiment of a generalized process 70 for automatically upgrading a license within a communication system. The process 70 includes analyzing a communication path between first and second nodes of a communication system, as indicated in block 72. The process 70 also includes analyzing a first (e.g., initial) license agreement having a first set of constraints regarding communication between the first and second nodes, as indicated in block 74. The process 70 is configured to determine, as indicated in decision diamond 76, whether or not the communication path is allowable under the first set of constraints of the first license agreement. If not, the process 70 proceeds to block 78 and performs the step of upgrading the first license agreement to a second license agreement having a second set of constraints that are less-restrictive than the first set of constraints regarding communication between the first and second nodes.

At this point, the process 70 may return to decision diamond 76 to determine if the updated license agreement is sufficient. For example, the steps represented by diamond 76 and block 78 may be repeated any number of times until the communication path is allowable under the presently-analyzed set of constraints of the presently-upgraded license agreement. The license may be upgraded any number of times, up to a point where the highest available class of licenses is obtained. Responsive to determining (in decision diamond 76) that the communication path is not allowable under the second (or subsequent) set of constraints of the second license agreement, the instructions further cause the processing device to upgrade the second (or subsequent) license agreement to a third (or subsequent) license agreement having a third (or subsequent) set of constraints, and so on.

The process 70 may also include enabling communication along the communication path, as indicated in block 80, in response to determining (in decision diamond 76) that the communication path is allowable under the first set of constraints of the first license agreement. Block 80 may also represent enabling communication along the communication path after any number of iterations of the decision diamond 76 to obtain a license having a high enough class to allow operation over the communication path. The first, second, third, etc. sets of constraints are related to at least a reach class that defines a maximum allowable transmission distance along the communication path.

The communication path may be a restoration path, secondary path, protection path, etc. for use when a fault is detected on a primary path between the first and second nodes of the communication system. The process 70 may also include the step of obtaining one or more cost conditions from a network operator, estimate an additional cost to switch from the primary path to the restoration path, and upgrade the first license agreement to the second license agreement when the additional cost meets the one or more cost conditions. The one or more cost conditions may include one or more of a maximum allowable increase in a transmission cost and a maximum allowable increase in a delay cost.

The first node may be referred to as an originating node and the second node may be referred to as a terminating node. The process 70 may further include the step of sending a request to a first transponder of the originating node for upgrading from the first license agreement to the second license agreement. Upon receipt of an acknowledgement that the first transponder has upgraded from the first license agreement to the second license agreement, the process 70 may further include sending a notify message to a second transponder of the terminating node. In some embodiments, the process 70 may be implemented by the license server 18 shown in FIG. 1 or a network device in communication with the license server 18. As such, the license server (or network device) may further include a database (or an interface in communication with the database) configured to store a shared pool of licenses available for upgrade. The shared pool of licenses may include at least the first and second license agreements.

Figure 6:
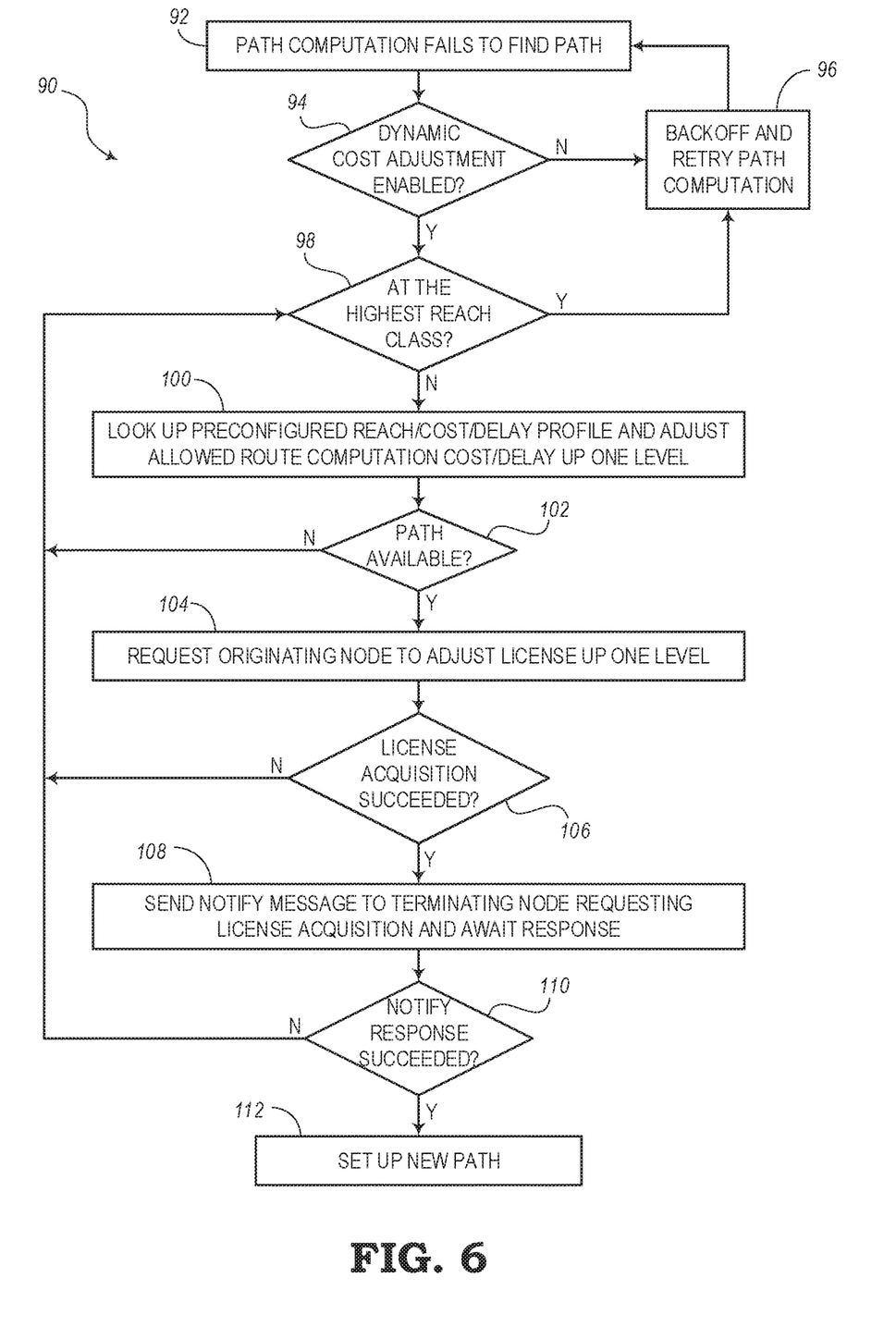
FIG. 6 is a flow diagram illustrating a process for operating the license server shown in FIG. 1, according to various embodiments.

FIG. 6 is a flow diagram illustrating an embodiment of a process 90 for operating the license server 18 or for operating a network device (e.g., one of nodes 12) in communication with the license server 18. The process 90 may be referred to as a decision flow for the originating node or NE (e.g., node 12A) for enhancing path computation. In this embodiment, the process 90 includes a first step of performing a path computation procedure. If an attempt to find a path using the path computation procedure fails, as indicated in block 92, the process 90 proceeds to decision diamond 94, which indicates a step of determining if a dynamic cost adjustment is enabled. If the dynamic cost adjustment is not enabled, then the process goes to block 96, which includes backing off and returning to block 92 to retry the path computation procedure.

If it is determined in decision diamond 94 that dynamic cost adjustment is enabled, then the process 90 proceeds to decision diamond 98, which includes the step of determining if the license has already reached its highest reach class. If the highest reach class has already been reached and there is no available higher reach class available for licensing, then the process 90 goes to block 96. Otherwise, if a higher reach class is available, the process 90 proceeds to block 100. The process 90 includes adjusting the allowed route computation cost/delay to one level up in a profile map, as indicated in block 100.

At this point, the process 90 includes determining if a path is available, as indicated in decision diamond 102. If no path is available, the process 90 goes to decision diamond 98 to determine if a higher level reach class is available. However, if it is determined in decision diamond 102 that a path is available, then the process 90 proceeds to block 104. As indicated in block 104, the process 90 includes requesting an originating transponder to increase the reach class. Decision diamond 106 includes the step of determining if a license acquisition has succeeded. If not, then the process 90 returns back to decision diamond 98 to increase the reach class (if a higher reach class is available). If it is determined in decision diamond 106 that the license acquisition has succeeded, then the process 90 proceeds to block 108.

The process 90 includes sending a control plane "notify" message to upgrade the license, as indicated in block 108. The notify message is sent to the terminating node for requesting license acquisition on the terminating node and waits for a response from the terminating node. Decision diamond 110 includes the step of determining if a notify response has been successfully received from the terminating node, indicating that the terminating node has upgraded its license to correspond to the license on the originating node. If a response is received indicating that the terminating node has not successfully upgraded the license, then the process 90 returns to decision diamond 98 for raising the license class. However, if it is determined that the terminating node successfully upgrades its license, then the process 90 goes on to block 112, which includes the step of setting up a new path under the new license.

The systems and methods of the present disclosure may be configured to allow a customer to allocate a lower reach license when a longer reach is not needed immediately. The systems can be enhanced by upgrading the license class once the requirement of the customer system changes. The present systems and methods provide advantages over conventional systems, whereby conventional transponders or modems connected to Layer 0 may have a "reach class" license that is configured in a static, inflexible manner, in that the license can only be provisioned by manual actions of a user or network operator. However, in the event of mesh restoration in photonics networks, if a modem line port detects that the measured link distance of a new path is greater than the provisioned reach class, traffic restoration fails in the conventional systems and a reach violation alarm is raised. On the other hand, the present disclosure provides systems and methods that can keep a "shared pool" of licenses available (in database 60) for automatic upgradation for N services in case they are at risk of resiliency failure.

The database 60 may also be configured in the Layer 0 control plane to keep a mapping of Reach vs Allowed Cost on paths for the configured line capacity. If a path computation failure is caused by a cost constraint not being met, based on originating and terminating drop transponder capability and available licenses in shared pool, the computing system 50 may evaluate if it could dynamically propose a path with higher cost than configured reach where SNC can come up after upgrading the reach class licenses of modem lines at originating and terminating nodes. The computing system 50 can upgrade the license "reach class" (in tandem on the transceiver 28 of the nodes 12A, 12B according to photonics control plane cost criteria). This may be done proactively for the secondary communication paths 16-2-16-n in response to protect path computation failure or reactively in response to a failure to find a working path.

The originating and terminating NEs (e.g., nodes 12A, 12B) may need to determine a list of supported reach lengths for the drop transponders of the photonic system 24 to potentially meet any adjustments to the license agreement. The information in this case could be user-configured as part of a provisioning process (either per connection or per port). This may be more applicable for foreign transponders. The information could be negotiated by an internal protocol (e.g., SPLI) to include additional attributes. Alternatively, protocols for management, controlling, and planning could be used to fetch the information and feed it to originating NE (e.g., node 12A), which may be similar to a user configuration from the standpoint of the NE. A terminating NE (e.g., node 12B) may need to pass this capability to the originating NE as part of a CONNECT message.

The originating node (e.g., node 12A) would need a preconfigured map or profile of Reach vs Cost Metrics for a configured line rate capacity. This may be a new Managed Object which would contain mapping of what should be configured route computation cost for each reach value. This could be populated as per configured mapping generated by one planner/user where longer links would need to be configured with higher cost (e.g., where cost vs reach would need to be correlated).

In some embodiments, the systems and methods of the present disclosure may have a provision to release long reach licenses back to a shared pool whenever the SNC runs on an upgraded reach license line. When a next mesh event is observed, a path computation may confirm from a reach/cost metrics profile that a new path can come up on a lower reach license. The SNC may acquire the lower reach license and release the longer reach license back to the license server 18 for other SNCs to use.

The systems and methods of the present disclosure are considered to include features that are novel with respect to conventional systems. For example, the present embodiments may include path computation using dynamic cost constraints on the basis of a transponder reach license capability. Also, some embodiments may provide dynamic upgradation/acquisition of reach licenses by "coherent" modem lines. In addition, the present disclosure may provide control plane triggering license upgrading procedures on the modem 22 via SPLI or other management, control, and planning schemes. The present disclosure also may be able to automatically relinquish a license when a lower reach path is available.

Thus, the present disclosure may provide numerous benefits with respect to the conventional systems. For example, with the flexibility of the present disclosure, the reporting of and/or providing alarms for license violations can be reduced, which will require less human interaction. Also, data traffic can be more resilient and may have less down time by implementing the systems and methods of the present disclosure to automatically acquire licenses (if available) and restore paths appropriately with fewer interruptions. Also, a vendor may be able to sell upgraded license pools for automated use. Another advantage is that it may be helpful for customers having higher reach modems that are currently configured with lower licenses for monetary savings.

The modems 22 of the nodes 12A, 12B may be configured with a single ordering code (e.g., PEC) for all applications. The modems 22 may include modem-class and reach-class licensing for managing applications and reach and may be based on the line port facility parameters includes a modem class and a reach class. The modems 22 may also include capacity licensing for managing constraints regarding capacity.

If a line port detects a mismatch of a modem class between the two ends of the link (e.g., communication path 16), traffic is blocked, but communication along a General Communication Channel (GCC) is not. A "Modem Class Mismatch" alarm may be raised. The modem class license may be released when the line port of the modem 22 is deleted.

If a line port detects that the measured link distance is greater than the provisioned reach class, the traffic is blocked, the communication on the GCC is not. A "Reach Violation" alarm may be raised. The reach class license may be released when the line port of the modem 22 is deleted.

The line port may be configured to validate the capacity license when a user attempts to cross-connect a client port to the line port via ENT-CRS-ODUCTP TL1. The command may be rejected if there is a capacity license violation detected against the request. Also, the capacity license may be released when deletion of cross-connection occurs.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A network device in communication with a license server, the network device comprising
    a processing device, and
    a memory device configured to store a computer program having instructions that, when executed, cause the processing device to
        analyze a communication path between modems at a first node and a second node of a communication system, wherein the modems support variable reach that is designated into a reach class that defines a maximum allowable transmission distance along the communication path,
        analyze a first license agreement having a first set of constraints regarding communication between the first and second nodes, and
        responsive to determining that the communication path is not allowable under the first set of constraints of the first license agreement, upgrade the first license agreement to a second license agreement having a second set of constraints that are less-restrictive than the first set of constraints regarding communication between the first and second nodes,
        wherein the first and second sets of constraints are related to at least the reach class.

2. The network device of claim 1, wherein the instructions, when executed, further cause the processing device to enable communication along the communication path in response to determining that the communication path is allowable under the second set of constraints of the second license agreement.

3. The network device of claim 1, wherein, responsive to determining that the communication path is not allowable under the second set of constraints of the second license agreement, the instructions further cause the processing device to upgrade the second license agreement to a third license agreement having a third set of constraints.

4. The network device of claim 1, wherein the communication path is a restoration path for use when a fault is detected on a primary path between the first and second nodes of the communication system.

5. The network device of claim 4, wherein the instructions, when executed, further cause the processing device to
    obtain one or more cost conditions available in the communication system,
    estimate an additional cost to switch from the primary path to the restoration path, and
    upgrade the first license agreement to the second license agreement when the additional cost meets the one or more cost conditions.

6. The network device of claim 5, wherein the one or more cost conditions include one or more of a maximum allowable increase in a transmission cost and a maximum allowable increase in a delay cost.

7. The network device of claim 1, wherein the first node is an originating node and the second node is a terminating node, and wherein the instructions, when executed, further cause the processing device to
    send a request to a first transponder of the originating node for upgrading from the first license agreement to the second license agreement, and
    upon receipt of an acknowledgement that the first transponder has upgraded from the first license agreement to the second license agreement, send a notify message to a second transponder of the terminating node.

8. The network device of claim 1, further comprising an interface in communication with a database that is configured to store a shared pool of license agreements available for upgrade, wherein the shared pool of license agreements includes at least the first and second license agreements.

9. A non-transitory computer-readable medium configured to store computer logic having instructions that, when executed, cause one or more processing devices to
    analyze a communication path between modems at a first node and a second node of a communication system, wherein the modems support variable reach that is designated into a reach class that defines a maximum allowable transmission distance along the communication path,
    analyze a first license agreement having a first set of constraints regarding communication between the first and second nodes, and
    responsive to determining that the communication path is not allowable under the first set of constraints of the first license agreement, upgrade the first license agreement to a second license agreement having a second set of constraints that are less-restrictive than the first set of constraints regarding communication between the first and second nodes, wherein the first and second sets of constraints are related to at least the reach class.

10. The non-transitory computer-readable medium of claim 9, wherein the instructions, when executed, further cause the one or more processing devices to enable communication along the communication path in response to determining that the communication path is allowable under the second set of constraints of the second license agreement.

11. The non-transitory computer-readable medium of claim 9, wherein, responsive to determining that the communication path is not allowable under the second set of constraints of the second license agreement, the instructions further cause the one or more processing devices to upgrade the second license agreement to a third license agreement having a third set of constraints.

12. The non-transitory computer-readable medium of claim 9, wherein the communication path is a restoration path for use when a fault is detected on a primary path between the first and second nodes of the communication system, and wherein the instructions, when executed, further cause the one or more processing devices to
- obtain one or more cost conditions from a network operator,
- estimate an additional cost to switch from the primary path to the restoration path, and
- upgrade the first license agreement to the second license agreement when the additional cost meets the one or more cost conditions,
- wherein the one or more cost conditions include one or more of a maximum allowable increase in a transmission cost and a maximum allowable increase in a delay cost.

13. A method comprising the steps of
- analyzing a communication path between modems at a first node and a second node of a communication system, wherein the modems support variable reach that is designated into a reach class that defines a maximum allowable transmission distance along the communication path,
- analyzing a first license agreement having a first set of constraints regarding communication between the first and second nodes, and
- responsive to determining that the communication path is not allowable under the first set of constraints of the first license agreement, upgrading the first license agreement to a second license agreement having a second set of constraints that are less-restrictive than the first set of constraints regarding communication between the first and second nodes, wherein the first and second sets of constraints are related to at least the reach class.

14. The method of claim 13, further comprising the step of enabling communication along the communication path in response to determining that the communication path is allowable under the second set of constraints of the second license agreement.

15. The method of claim 13, further comprising the step of upgrading the second license agreement to a third license agreement having a third set of constraint responsive to determining that the communication path is not allowable under the second set of constraints of the second license agreement.

16. The method of claim 13, wherein the communication path is a restoration path for use when a fault is detected on a primary path between the first and second nodes of the communication system, wherein the method further comprises the steps of
- obtaining one or more cost conditions from a network operator,
- estimating an additional cost to switch from the primary path to the restoration path, and
- upgrading the first license agreement to the second license agreement when the additional cost meets the one or more cost conditions,
- wherein the one or more cost conditions include one or more of a maximum allowable increase in a transmission cost and a maximum allowable increase in a delay cost.

17. The method of claim 13, wherein the first node is an originating node and the second node is a terminating node, and wherein the method further comprises the steps of
- sending a request to a first transponder of the originating node for upgrading from the first license agreement to the second license agreement, and
- upon receipt of an acknowledgement that the first transponder has upgraded from the first license agreement to the second license agreement, sending a notify message to a second transponder of the terminating node.

* * * * *